(12) United States Patent
Shirai

(10) Patent No.: US 6,731,958 B1
(45) Date of Patent: May 4, 2004

(54) PORTABLE RADIO COMMUNICATION APPARATUS WITH IMPROVED POWER-SAVING FUNCTION

(75) Inventor: Koji Shirai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/495,450

(22) Filed: Feb. 1, 2000

(30) Foreign Application Priority Data

Feb. 2, 1999 (JP) .......................................... 11-024567

(51) Int. Cl.[7] .................................................. H04B 1/38
(52) U.S. Cl. ...................... 455/574; 455/550; 455/556; 455/343; 455/127; 345/211; 345/212; 345/214; 379/433.06; 379/433.07; 379/368
(58) Field of Search ................................. 455/550, 566, 455/574, 343, 127; 345/211, 212, 214; 379/433.06, 433.07, 368

(56) References Cited

U.S. PATENT DOCUMENTS

| | | | | | |
|---|---|---|---|---|---|
| 5,548,832 | A | * | 8/1996 | Karam | 340/7.32 |
| 5,881,377 | A | * | 3/1999 | Giel et al. | 340/7.32 |
| 5,894,298 | A | * | 4/1999 | Hoeksma | 345/102 |
| 5,995,846 | A | * | 11/1999 | Jakobsen | 368/47 |
| 6,046,730 | A | * | 4/2000 | Bowen et al. | 250/227.22 |
| 6,125,286 | A | * | 9/2000 | Jahagirdar et al. | 455/566 |
| 6,141,568 | A | * | 10/2000 | Sakaguchi | 455/550 |
| 6,278,887 | B1 | * | 8/2001 | Son et al. | 345/211 |

FOREIGN PATENT DOCUMENTS

| | | | |
|---|---|---|---|
| GB | 2 325 821 | * | 2/1998 |
| GB | 2 319 878 | * | 3/1998 |
| GB | 2 324 228 A | | 10/1998 |
| JP | 4-235442 | | 8/1992 |
| JP | 5-15555 | | 2/1993 |
| JP | 5-102910 | | 4/1993 |
| JP | 9-27844 | | 1/1997 |
| JP | 10-23129 | | 1/1998 |
| JP | 10-224289 | | 8/1998 |
| JP | 10-304031 | | 11/1998 |
| JP | 11-112622 | | 4/1999 |
| JP | 11-196038 | | 7/1999 |
| JP | 10-98273 | | 10/1999 |

* cited by examiner

Primary Examiner—Nay Maung
Assistant Examiner—Sujatha Sharma
(74) Attorney, Agent, or Firm—Sughrue Mion, PLLC

(57) ABSTRACT

A portable radio communication apparatus which allows reduction in power consumption is disclosed. An input device has a special key and a plurality of general keys. A microprocessor changes an operation mode from a power-saving mode to a normal operation mode when receiving an interrupt signal. A controller connected to the special key outputs the interrupt signal to the microprocessor when one of the general keys is operated. When the special key is operated, the controller controls a backlit LCD without outputting the interrupt signal such that the LCD is backlighted and predetermined information is displayed on the LCD.

14 Claims, 3 Drawing Sheets

PORTABLE RADIO COMMUNICATION APPARATUS WITH IMPROVED POWER-SAVING FUNCTION

BACKGROUND OF THE INVENTION

1. Field of the Invention

The present invention relates to a portable radio communication apparatus and, particularly, to a radio communication apparatus and a power-saving method thereof.

2. Description of the Prior Art

In general, portable or mobile telephones carried by users are battery-powered. Therefore, it is very important to effectively use the battery power so that the standby or continuous operation time period becomes as long as possible. Therefore, it is desirable that its power consumption be minimized.

To achieve reduction in power consumption, a portable telephone has two operation modes: a normal operation mode and a power-saving mode (which may be called HALT mode, IDOL mode, or STOP mode). When the portable telephone is not used, it operates in the power-saving mode, More specifically, a CPU of the portable telephone controls an intermittently receiving operation to monitor the occurrence of an incoming call and further monitors a key input through a keypad. When an incoming call occurs or any key is depressed, the operation mode is changed from the power-saving mode to the normal operation mode. If no incoming call or no key operation occurs for more than a predetermined time period, then the operation mode returns to the power-saving mode. The time for returning to the power-saving mode varies depending on the maker producing a portable radio telephone.

On the other hand, a liquid-crystal display (LCD), with backlighting has been widely used in a portable radio telephone. Such a backlit LCD improves the LCD screen's readability but draws more power than an ordinary LCD does. Therefore, reduction in power consumption is an indispensable condition especially for a battery-powered radio telephone terminal having the LCD with backlighting.

To reduce in power consumption, several power-saving methods have been proposed. For example, in Japanese Patent Unexamined Publication No. 9-27844, a portable telephone having a backlight-control function is disclosed. More specifically, the LCD is backlighted when any key input or an incoming call occurs in dark conditions and, after a lapse of a predetermined time period, the backlighting is shut off.

Another portable terminal having backlight-control function is also disclosed in Japanese Patent Unexamined Publication No. 10-23129. In this portable terminal, an interrupt occurs and the LCD is backlighted when any key input occurs at predetermined times of day. After a lapse of a predetermined time period, the backlighting is shut off. If the key input occurs at any time other that the predetermined times of day, then the LCD is not backlighted.

However, the user does not always operate the keypad so as to make a call but just to watch radio conditions or the time of day. Recently, an increasing number of radio telephones have a function of displaying an animated comic character on screen. Therefore, the user frequently operates the keypad to see such an animated comic character. According to the prior arts as described above, such a key operation which is not intended to make a call causes the microprocessor (CPU) to change from the power-saving mode to the normal operation mode. This causes the battery power to be wasted.

SUMMARY OF THE INVENTION

An object of the present invention is to provide a radio communication apparatus and a power-saving method which can achieve reduction in power consumption.

Another object of the present invention is to provide a radio communication apparatus and a power-saving method which can perform predetermined operations without the microprocessor changing from the power-saving mode to the normal operation mode.

According to an aspect of the present invention, a portable radio communication apparatus operable in one of a normal operation mode and a power-saving mode, comprises:

an input device having a plurality of keys consisting of a predetermined key and a plurality of general keys;

a first controller for changing an operation mode of the portable radio communication apparatus from the power-saving mode to the normal operation mode when receiving an interrupt signal; and a second controller for outputting the interrupt signal to the first controller when one of the general keys is operated and starting a predetermined operation without outputting the interrupt signal when the predetermined key is operated.

According to another aspect of the present invention, a portable radio communication apparatus operable in one of a normal operation mode and a power-saving mode, comprises:

a display;

a light for backlighting at least the display;

an input device having a plurality of keys consisting of a predetermined key and a plurality of general keys;

a first controller for changing an operation mode of the portable radio communication apparatus from the power-saving mode to the normal operation mode when receiving an interrupt signal; and a second controller for outputting the interrupt signal to the first controller when one of the general keys is operated and, when the predetermined key is operated, controlling the display and the light without outputting the interrupt signal such that the light backlights the display and predetermined information is displayed on the display.

The predetermined information may be at least one of the time of day, an electric field strength of a radio receiving signal, and an animated comic character.

The second controller may control the light such that the light backlights the display during an interval that the predetermined key is operated. The second controller may control the light such that the light backlights the display until after a lapse of a predetermined time period from a time when the predetermined key is operated.

The portable radio communication apparatus may comprise a memory storing a plurality of items of information each corresponding to a different predetermined operation. The predetermined information is a selected one of the items of information. The predetermined information is preferably a selected one of the time of day, an electric field strength of a radio receiving signal, and an animated comic character.

The predetermined key is preferably separated from a key matrix mounted with the general keys such that the predetermined key is provided near the display. The plurality of keys may be integrated on a single key matrix.

The plurality of keys may include a function key which is used to switch the second controller between active and inactive.

The input device and the second controller may be integrated to form a key input controller for outputting the interrupt signal to the first controller when one of the general keys is operated and, when the predetermined key is operated, controlling the display and the light without outputting the interrupt signal such that the light backlights the display and predetermined information is displayed on the display.

As described above, according to the present invention, when the predetermined key to depressed in the power-saving mode, the displaying and backlighting operations can be performed by the second controller while the first controller is in the power-saving mode. Therefore, the power consumption can be dramatically reduced.

Further, according to the present invention, the display processing of the predetermined information can be also performed by the second controller while the first controller operates in the normal operation mode. Therefore, some of the display processing load is taken off the first controller, resulting in improved processing speed of the first controller.

Furthermore, in the case of the memory storing necessary data for a plurality of predetermined operations, a selected one of the predetermined operations can be performed independently of the normal operations while the first controller operating in the power-saving mode.

DESCRIPTION OF THE PREFERRED EMBODIMENTS

Figure 1:
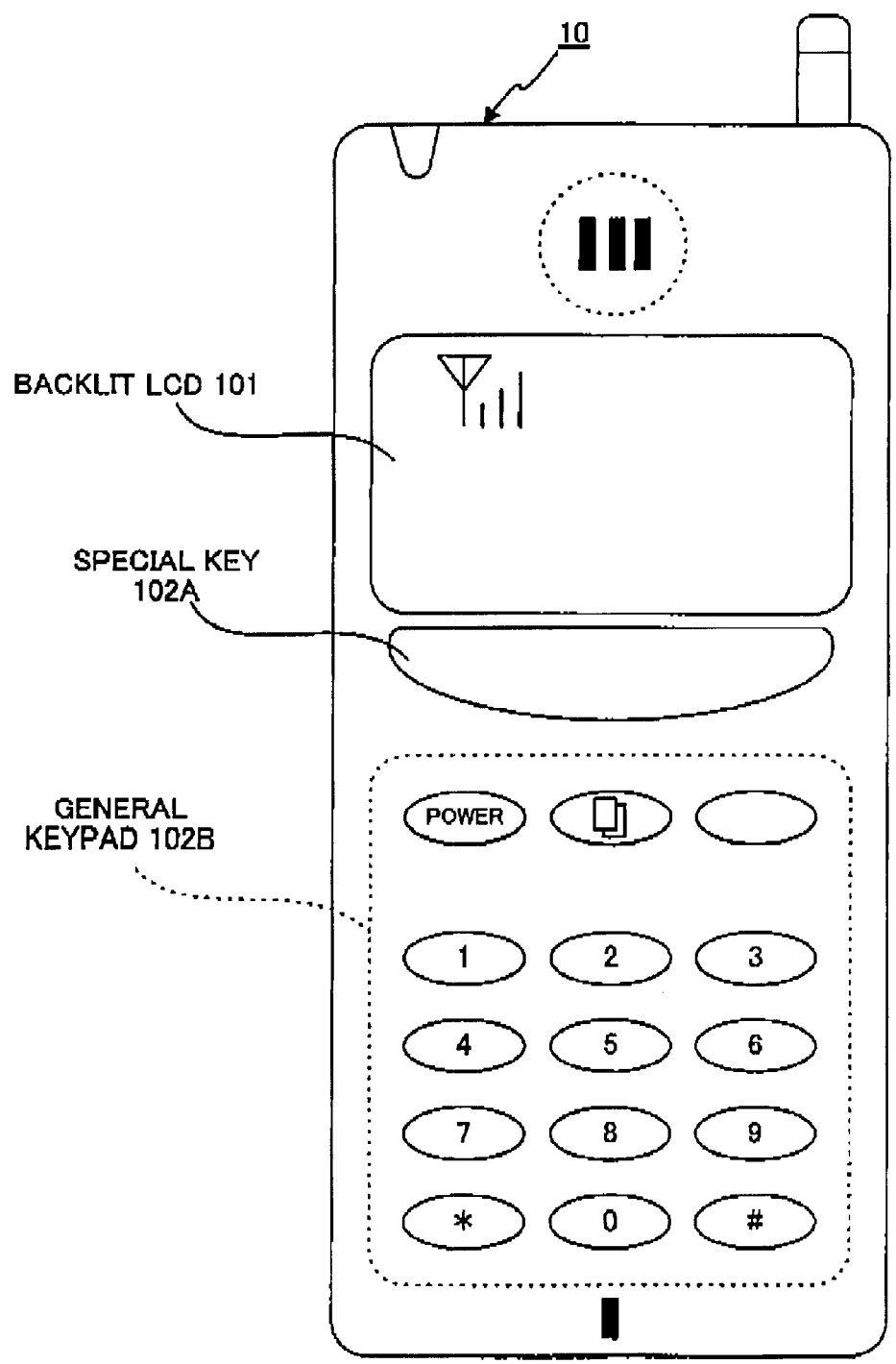
FIG. 1 is a plan view showing a portable radio communication apparatus implementing a power-saving method according to the present invention.

Referring to FIG. 1, a portable radio communication terminal 10 such as a mobile telephone having a power-saving function according to the present invention is provided with a backlit liquid-crystal display (LCD) 101, a special key 102A, and a general keypad 102B. The special key 102A is provided at a position adjacent to the LCD 101. According to the present invention, as described later, when a user depresses the special key 102A, the LCD 101 is backlighted and predetermined information such as the present time of day or the present electric field strength (radio condition) is displayed on the LCD 101. Therefore, it is preferable that the special key 102A is provided near the LCD 101. The general keypad 102B is a well-known keypad including a ten-key pad for dialing or other operations.

Figure 2:
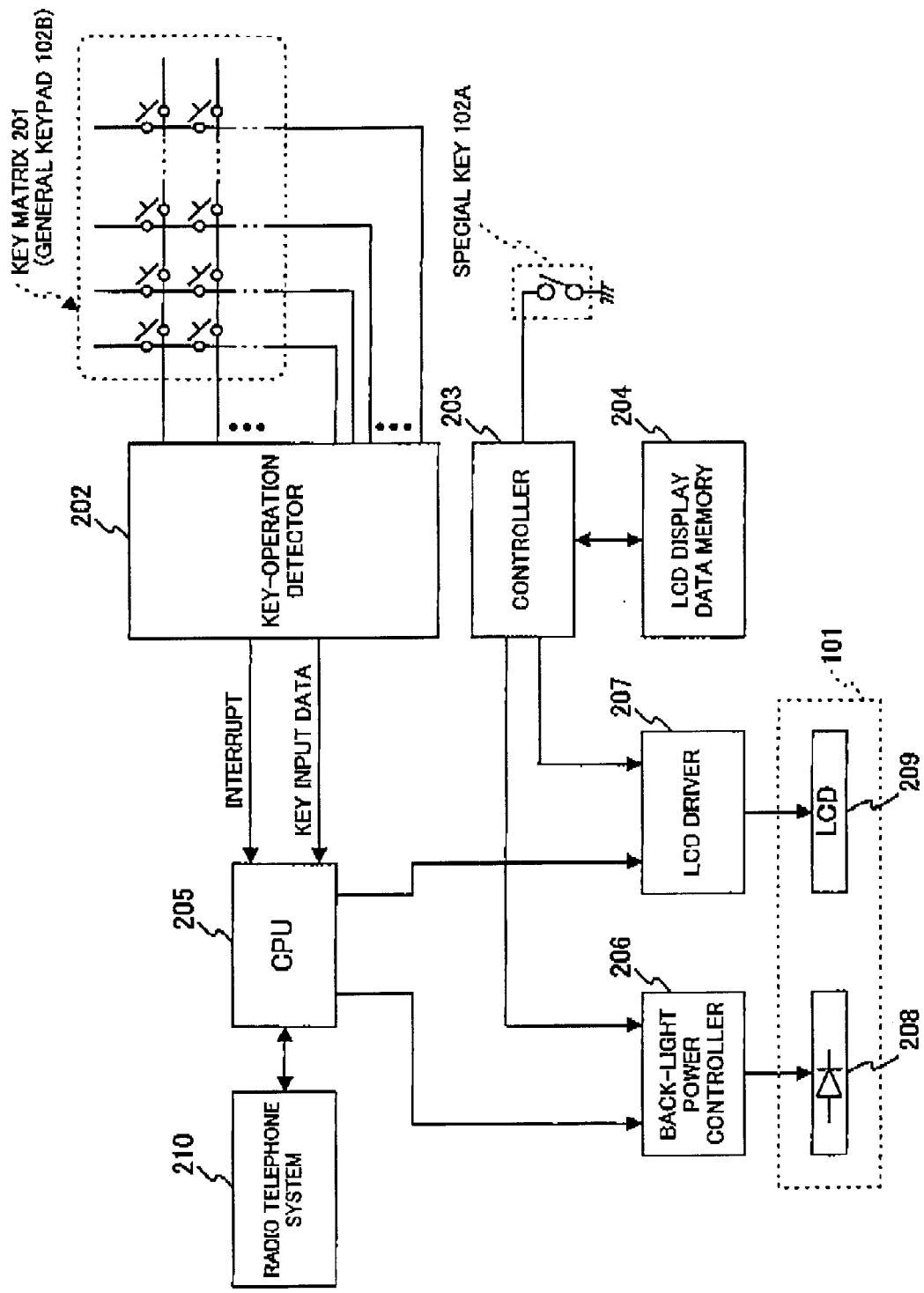
FIG. 2 is a block diagram showing an internal circuit configuration of the portable radio communication apparatus according to a first embodiment of the present invention.

Referring to FIG. 2, a key matrix 201 which is provided under the general keypad 102B is connected to a key-operation detector 202. The key switches of the key matrix 201 are scanned by the key-operation detector 202 so as to determine which key is depressed.

The telephone terminal 10 is further provided with a controller 203 connected to an LCD display data memory 204 and a key switch of the special key 102A. The key-operation detector 202 is connected to a microprocessor (CPU) 205. When any key of the general keypad 1025 is depressed, the key-operation detector 202 outputs an interrupt signal to the CPU 205 and then outputs the key input data corresponding to the depressed key to the CPU 205.

The CPU 205 controls a back-light power controller 206 and an LCD driver 207 which are connected to a light-emitting diode (LED) unit 208 and an LCD 209, respectively. The LCD 209 is designed to be backlighted by the LED unit 208 to form the backlit LCD 101. The CPU 205 is connected to a well-known radio telephone system 210.

The CPU 205, when receiving the interrupt signal from the key-operation detector 202, determines whether the present operation mode is the normal operation mode or the power-saving mode. When in the power-saving mode, the CPU 205 changes into the normal operation mode and controls the back-light power controller 206 to backlight the LCD 209 and then starts the normal operation depending on the key input data. That is, necessary information depending on the key input data is displayed on the LCD 209. When in the normal operation mode, the CPU 205 performs the normal operation depending on the key input data. In addition to the key input monitoring, the CPU 205 also monitors an incoming call at regular intervals. If an incoming call occurs in the power-saving mode, then the CPU 205 changes into the normal operation mode.

The controller 203 determines whether the special key 102A is depressed. When detecting that the special key 102A is depressed, the controller 203 uses predetermined display data stored in the LCD display data memory 204 to control the back-light power controller 206 and the LCD driver 207. More specifically, the LCD 101 is backlighted and predetermined information such as the present time of day or the present electric field strength is displayed on the LCD 101. The controller 203 may use a clock/calendar circuit (not shown) built into the telephone terminal 10. The predetermined information displayed on the LCD 101 may be selected from the present time of day, the present electric field strength, an animated comic character and the like which are stored in the LCD display data memory 204.

In this manner, in the case where the special key 102A is depressed, the controller 203 does not output an interrupt signal and controls the back-light power controller 206 to supply power to the LED unit 208 and outputs the desired display data to the LCD driver 207. Therefore, the LED unit 208 is powered on without the CPU 205 changing into the normal operation mode and the desired information (which may be a selected one as described above) is displayed on the backlighted LCD 101. In other words, the LCD 209 is backlighed by the LED unit 208 and the predetermined information is displayed thereon while the CPU 205 operating in the power-saving mode.

Another backlighting method may be employed. For example, the LCD 209 is backlighted by the LED unit 208 only during depressing the special key 102A. Alternatively, the LCD 209 may be backlighted by the LED unit 208 until a predetermined time period has elapsed from the push of the special key 102A.

A second embodiment of the present invention will be described with reference to FIG. 3, where circuit blocks similar to those previously described with reference to FIG. 2 are denoted by the same reference numerals and the details thereof are omitted.

Figure 3:
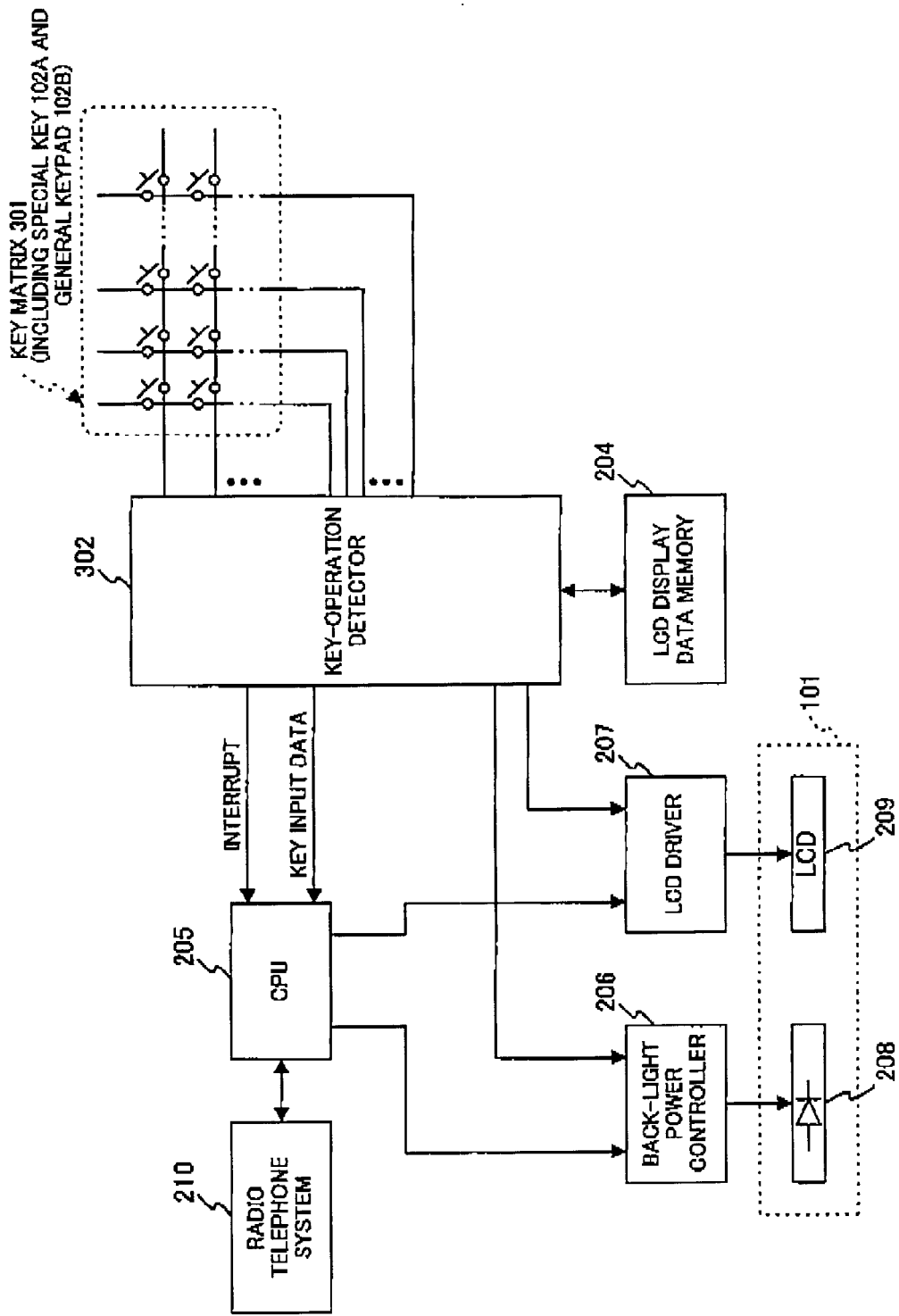
FIG. 3 is a block diagram showing an internal circuit configuration of a portable radio communication apparatus according to a second embodiment of the present invention.

Referring to FIG. 3, a portable radio telephone 10 according to the second embodiment is provided with a key matrix 301 which is connected to a key-operation controller 302. The key switches of the key matrix 301 are scanned by the key-operation controller 302 so as to determine which key is depressed. The key-operation controller 302 is connected to the LCD display data memory 204 and the CPU 205.

One of the key switches of the key matrix 301 is predetermined as the special key 102A and the other key switches as the keys of the general keypad 102B. As in the case of the first embodiment, when detecting that the special key 102A is depressed, the key-operation controller 302 uses predetermined display data stored in the LCD display data memory 204 to control the back-light power controller 206 and the LCD driver 207. More specifically, the LCD 101 is backlighted and predetermined information such as the present time of day or the present electric field strength is displayed on the LCD 101. When detecting that any key of the general keypad 102B is depressed, the key-operation controller 302 outputs an interrupt signal to the CPU 205 and then outputs the key input data corresponding to the depressed key to the CPU 205.

The power-saving backlight function according to the second embodiment may switch selectively between active and inactive. Such active/inactive selection can be implemented as a function included in a man-machine interface (MMI). In the case where the power-saving backlight function is in the active state, a push of a numeric key, for example the "1" key, causes the key-operation controller 302 to use the predetermined display data stored in the LCD display data memory 204 to control the back-light power controller 206 and the LCD driver 207 with the CPU 205 operating in the power-saving mode.

As another example, when the special key 102A has been pushed, only the information displaying area of the LCD 209 is backlighted. When any of the general keypad 102B has been depressed, both the LCD 209 and the keypad 102B are backlighted.

As described above, according to the present inventions when the special key 102A is depressed in the power-saving mode such as the standby mode, the LCD displaying and the backlighting operations can be performed by the controller 202 or the key-operation controller 302 while the CPU 205 is in the power-saving mode. Therefore, the power consumption can be dramatically reduced.

In contrast, according to the prior arts, even in the case where the user intends to backlight the LCD, the CPU is changed from the power-saving mode to the normal operation mode, resulting in increased power consumption. In general, the power consumption of the normal operation mode is one hundred to thousand times larger than that of the power-saving mode. Therefore, a very large amount of battery power is wasted for only the purpose of backlighting the LCD. The portable radio communication apparatus according to the present invention can eliminate such a waste of power consumption.

Further, according to the present invention, the display processing of the predetermined information can be also performed by the controller 203 while the CPU operating in the normal operation mode. Therefore, some of the display processing load is taken off the CPU 205, resulting in improved processing speed of the CPU 205.

Furthermore, in the case of the LCD display data memory 204 storing necessary data for a plurality of predetermined operations, a selected one of the predetermined operations can be performed independently of the normal operations while the CPU 205 operating in the power-saving mode.

What is claimed is:

1. A portable radio communication apparatus operable in one of a normal operation mode and a power-saving mode, comprising:

an input device having a plurality of keys consisting of a predetermined key and a plurality of general keys;

a first controller for changing an operation mode of the portable radio communication apparatus from the power-saving mode to the normal operation mode when receiving an interrupt signal; and a second controller for outputting the interrupt signal to the first controller when one of the general keys is operated and starting a predetermined operation that includes lighting a display without outputting the interrupt signal when the predetermined key is operated.

2. A portable radio communication apparatus operable in one of a normal operation mode and a power-saving mode, comprising:

a display;

a light for backlighting at least the display;

an input device having a plurality of keys consisting of a predetermined key and a plurality of general keys;

a first controller for changing an operation mode of the portable radio communication apparatus from the power-saving mode to the normal operation mode when receiving an interrupt signal; and a second controller for outputting the interrupt signal to the first controller when one of the general keys is operated and, when the predetermined key is operated, controlling the display and the light without outputting the interrupt signal such that the light backlights the display and predetermined information is displayed on the display.

3. The portable radio communication apparatus according to claim 2, wherein the predetermined information is at least one of the time of day, an electric field strength of a radio receiving signal, and an animated comic character.

4. The portable radio communication apparatus according to claim 2, wherein the second controller controls the light such that the light backlights the display during an interval that the predetermined key is operated.

5. The portable radio communication apparatus according to claim 2, wherein the second controller controls the light such that the light backlights the display until after a lapse of a predetermined time period from a time when the predetermined key is operated.

6. The portable radio communication apparatus according to claim 2, wherein the light backlights the display and each of the predetermined key and the keys.

7. The portable radio communication apparatus according to claim 2, further comprising a memory storing a plurality of items of information each corresponding to a different predetermined operation, wherein the predetermined information is a selected one of the items of information.

8. The portable radio communication apparatus according to claim 7, wherein the predetermined information is a selected one of the time of day, an electric field strength of a radio receiving signal, and an animated comic character.

9. The portable radio communication apparatus according to claim 2, wherein the predetermined key is separated from a key matrix mounted with the general keys such that the predetermined key is provided near the display.

10. The portable radio communication apparatus according to claim 2, wherein the plurality of keys are integrated on a single key matrix.

11. The portable radio communication apparatus according to claim 2, wherein the plurality of keys includes a function key which is used to switch the second controller between active and inactive.

12. A portable radio communication apparatus operable in one of a normal operation mode and a power-saving mode, comprising:

a display;

a light for backlighting at least the display;

a controller for changing an operation mode of the portable radio communication apparatus from the power-saving mode to the normal operation mode when receiving an interrupt signal; and a key input controller having a plurality of keys consisting of a predetermined key and a plurality of general keys, for outputting the interrupt signal to the first controller when one of the general keys is operated and, when the predetermined key is operated, controlling the display and the light without outputting the interrupt signal such that the light backlights the display and predetermined information is displayed on the display.

13. A power-saving method in a portable radio communication apparatus operable in one of a normal operation mode and a power-saving mode, the portable radio communication apparatus comprising a microprocessor and an input device having a plurality of keys consisting of a predetermined key and a plurality of general keys, comprising:

outputting an interrupt signal to the microprocessor when one of the general keys is operated; and starting a predetermined operation that includes lighting a display without outputting the interrupt signal when the predetermined key is operated, wherein the microprocessor changes an operation mode of the portable radio communication apparatus from the power-saving mode to the normal operation mode when receiving the interrupt signal.

14. A power-saving method in a portable radio communication apparatus operable in one of a normal operation mode and a power-saving mode, the portable radio communication apparatus comprising:

a microprocessor;

a display;

a light for backlighting at least the display; and an input device having a plurality of keys consisting of a predetermined key and a plurality of general keys, comprising:

outputting an interrupt signal to the microprocessor when one of the general keys is operated; and backlighting the display and displaying predetermined information on the display without outputting the interrupt signal when the predetermined key is operated, wherein the microprocessor changes an operation mode of the portable radio communication apparatus from the power-saving mode to the normal operation mode when receiving the interrupt signal.

* * * * *

UNITED STATES PATENT AND TRADEMARK OFFICE
CERTIFICATE OF CORRECTION

PATENT NO.   : 6,731,958 B1
DATED        : May 4, 2004
INVENTOR(S)  : Koji Shirai It is certified that error appears in the above-identified patent and that said Letters Patent is hereby corrected as shown below:

<u>Column 3,</u>
Line 64, "1025" has been replaced with -- 102B --.

Signed and Sealed this

Tenth Day of August, 2004

JON W. DUDAS
*Acting Director of the United States Patent and Trademark Office*